United States Patent
Schraeder

(10) Patent No.: US 12,359,703 B2
(45) Date of Patent: Jul. 15, 2025

(54) JOUNCE BUMPER OF AN AUTOMOTIVE VEHICLE SUSPENSION SYSTEM, AND METHOD OF PRODUCING SUCH A JOUNCE BUMPER

(71) Applicant: BASF Polyurethanes GmbH, Lemfoerde (DE)

(72) Inventor: Ansgar Schraeder, Lemfoerde (DE)

(73) Assignee: BASF Polyurethanes GmbH, Lemfoerde (DE)

( * ) Notice: Subject to any disclaimer, the term of this patent is extended or adjusted under 35 U.S.C. 154(b) by 401 days.

(21) Appl. No.: 17/756,719

(22) PCT Filed: Dec. 3, 2020

(86) PCT No.: PCT/EP2020/084496
§ 371 (c)(1),
(2) Date: Jun. 1, 2022

(87) PCT Pub. No.: WO2021/110850
PCT Pub. Date: Jun. 10, 2021

(65) Prior Publication Data
US 2023/0003273 A1    Jan. 5, 2023

(30) Foreign Application Priority Data
Dec. 3, 2019 (EP) .................... 19213313

(51) Int. Cl.
*F16F 3/12* (2006.01)
*B29C 44/12* (2006.01)
(Continued)

(52) U.S. Cl.
CPC ............ *F16F 3/12* (2013.01); *B29C 44/1266* (2013.01); *B60G 11/14* (2013.01);
(Continued)

(58) Field of Classification Search
CPC ... F16F 1/371; F16F 3/12; F16F 1/028; B29C 44/1266; B29K 2075/00;
(Continued)

(56) References Cited

U.S. PATENT DOCUMENTS 3,416,783 A * 12/1968 Tondato ................... F16F 3/12
                                                    213/40 R
4,763,882 A *  8/1988 Nishiyama ............... F16F 3/12
                                                    267/152
(Continued)

FOREIGN PATENT DOCUMENTS

FR          2316482 A1 *  1/1977
FR          2404770 A2 *  4/1979
KR     10-2019-0103643     9/2019

OTHER PUBLICATIONS

English machined translation of FR-2404770-A2, Apr. 27, 1979.*
(Continued)

*Primary Examiner* — Robert A. Siconolfi
*Assistant Examiner* — San M Aung
(74) *Attorney, Agent, or Firm* — Grüneberg and Myers PLLC

(57) ABSTRACT

A jounce bumper of an automotive vehicle suspension system contains a longitudinal axis. The jounce bumper is configured to resiliently deform between an uncompressed state and a compressed state, where in the compressed state the jounce bumper has a smaller length in the direction of the longitudinal axis than in the uncompressed state. The jounce bumper also contains a base body that acts as a primary spring element, where the base body is partially or completely made of a volume-compressible first material. In particular, the base body further contains at least one secondary spring element integrated within the base body. The secondary spring element is resiliently deformable between a first length in the uncompressed state and a second length (Continued)

in the compressed state, where the second length is smaller than the first length. The secondary spring element is partially or completely made of a compact second material.

17 Claims, 6 Drawing Sheets

(51) Int. Cl.
  *B29K 75/00* (2006.01)
  *B29L 31/30* (2006.01)
  *B60G 11/14* (2006.01)

(52) U.S. Cl.
  CPC ... *B29K 2075/00* (2013.01); *B29L 2031/3044* (2013.01); *B60G 2202/12* (2013.01); *B60G 2206/7101* (2013.01); *B60G 2206/7104* (2013.01); *B60G 2206/71042* (2013.01); *B60G 2206/73* (2013.01)

(58) Field of Classification Search
  CPC ............ B29L 2031/3044; B60G 11/14; B60G 2202/12; B60G 2206/73; B60G 2206/7101; B60G 2206/7104; B60G 2206/71042
  USPC .......................................................... 267/259
  See application file for complete search history.

(56) References Cited

U.S. PATENT DOCUMENTS

| | | | | |
|---|---|---|---|---|
| 4,817,921 A * | 4/1989 | Stevenson | ................. | F16F 3/12 280/124.179 |
| 4,874,154 A * | 10/1989 | Zimbone | ................... | F16F 3/12 267/140.4 |
| 4,886,256 A * | 12/1989 | Nishiyama | .............. | B60G 15/07 267/221 |
| 5,118,086 A * | 6/1992 | Stevenson | ............... | F16F 13/08 267/141.1 |
| 5,364,086 A * | 11/1994 | Paton | ................... | B60G 11/465 267/35 |
| 6,113,082 A * | 9/2000 | Fujino | ..................... | F16F 1/025 |
| 2004/0140283 A1* | 7/2004 | Salis | ....................... | B61F 5/142 213/40 R |
| 2015/0076754 A1* | 3/2015 | Feng | ......................... | F16F 3/12 267/140.4 |
| 2018/0195572 A1* | 7/2018 | Kashani | ................ | F16F 1/3615 |
| 2018/0216688 A1* | 8/2018 | Steinmaier | .............. | F01N 13/16 |
| 2019/0101177 A1* | 4/2019 | Parnoutsoukian | ........ | H01B 5/16 |

OTHER PUBLICATIONS

Office Action issued in Japanese Patent Application No. 2022-533521 on Nov. 26, 2024 13 pages (with English translation).

* cited by examiner

JOUNCE BUMPER OF AN AUTOMOTIVE VEHICLE SUSPENSION SYSTEM, AND METHOD OF PRODUCING SUCH A JOUNCE BUMPER

CROSS-REFERENCE TO RELATED APPLICATIONS

This application is the National Stage entry under § 371 of International Application No. PCT/EP2020/084496, filed on Dec. 3, 2020, and which claims the benefit of priority to European Application No. 19213313.0, filed on Dec. 3, 2019. The content of each of these applications is hereby incorporated by reference in its entirety.

BACKGROUND OF THE INVENTION

Field of the Invention

The invention relates to a jounce bumper of an automotive vehicle suspension system, comprising a longitudinal axis, wherein the jounce bumper is configured to resiliently deform between an uncompressed state and a compressed state, wherein in the compressed state, the jounce bumper has a smaller length in the direction of the longitudinal axis than in the uncompressed state, and a base body that acts as a primary spring element, wherein the base body is partially or completely made of a volume-compressible first material.

Description of Related Art

Jounce bumpers of the aforementioned type are generally known in the art. They have been used in the automotive industry to provide an additional spring element in shock absorber systems to prevent damage from occurring to the shock absorber in case of excessive impacts.

The use of volume-compressible materials such as cellular, in particular micro-cellular polyurethane foams has been gaining relevance in recent years due to the advantageous properties of these volume-compressible materials. The production of jounce bumpers, i.e. the base bodies of those jounce bumpers from these volume-compressible materials is generally known in the art, inter alia from documents EP A 62 83, EP A 36 994, EP A 250 969, DE A 195 48 770 and DE A 195 48 771.

A number of users have in the past relied on of rubber materials instead of volume-compressible materials. Rubber or similar materials have a reduced compression capability in direct comparison with volume-compressible materials, but at the same time also have a higher block length in the direction of the longitudinal axis. For some applications, increased block length is a desired property leading to a certain reluctance in adopting the use of otherwise advantageous volume-compressible materials.

SUMMARY OF THE INVENTION

It has therefore been an object of the invention to provide a jounce bumper which overcomes the challenges mentioned hereinabove as far as possible. In particular, it was an object of the invention to suggest jounce bumper, the base body of which can be made from volume-compressible material, but at the same time provides larger block length without adversely affecting the dampening and suspension characteristics afforded by the volume-compressible material.

The invention achieves the object by suggesting a jounce bumper of the aforementioned type, wherein the base body further comprises at least one secondary spring element integrated within the base body, wherein the secondary spring element is resiliently deformable between a first length in the uncompressed state and a second length in the compressed state, the second length being smaller than the first length, and partially or completely made of a compact second material.

DETAILED DESCRIPTION OF THE INVENTION

Figure 1:
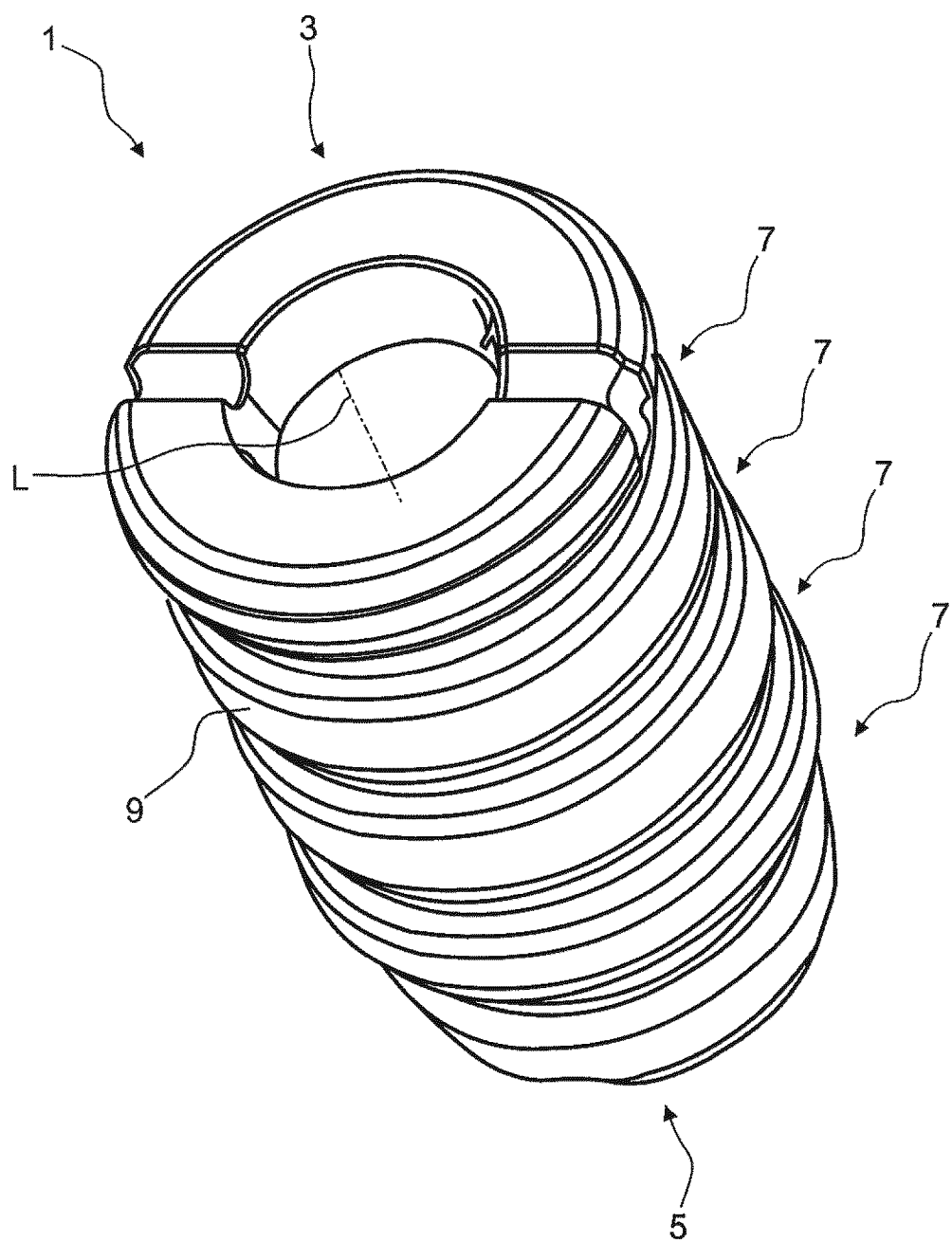
FIG. 1 shows a schematic three-dimensional view of a jounce bumper according to a preferred embodiment.

In terms of the invention, compact materials are understood to be non-cellular and insofar not or at least less volume-compressible. The length reduction in the direction of the longitudinal axis with these materials is typically compensated at least in part by a radial expansion inwards and/or outwards.

The invention is thus based upon the realization that by integrating a secondary spring element having material properties that lead to reduced compressibility affords an increase of the block length of the jounce bumper as a whole. On its way towards reaching the compressed state, the secondary spring element resists the compression in the axial direction within the limits determined by its spring rate, which can be selected based upon customer-specific requirements. At the same time, the primary spring element, i.e. the base body, can still be made of volume-compressible material which affords a sensitive, i.e. "soft" initial deformation resistance such that the jounce bumper is an ideal compromise between purely volume-compressible jounce bumper and purely compact jounce bumpers: The deformation resistance is soft in the initially deformation stages, but increasingly progressive as deformation increases, including an increased block length which is defined by the length of the secondary spring element in its compressed state.

By integrating the secondary spring element into the volume of the base body, the invention suggests a singular part where in prior art solutions the jounce bumper would typically be amended with additional supporting members such as stiffening rings or the like in attempts to create a progressive stiffening of the jounce bumper. The invention thus suggests a jounce bumper having improved suspension properties while at the same time affording a simplified installation on the vehicle suspension system, in particular by protecting and shielding the secondary spring element from environmental influences.

In a preferred embodiment, the base body at least partially, and preferably completely encapsulates the secondary spring element. Further particularly, the secondary spring element is encapsulated by the base body in a substantially cavity-free manner.

In a further preferred embodiment, the secondary spring element is configured to have a predetermined block length when in the compressed state.

In a further preferred embodiment, the first spring element comprises a first spring rate and a secondary spring element comprises a second spring rate that is lower than the first spring rate or equal to the spring rate. The spring rate is understood to mean the ratio by which the respective spring element can be compressed relative to its uncompressed basic state. As an example, a spring element of 100 mm length in its basic state and 30 mm in its fully compressed state (block length) would have a spring rate of 70%. A lower spring rate thus indicates that the block length relative to the length in the uncompressed state is increased.

Further preferably, the spring rate of the first spring element (without the second spring element) is in the range of more than 65%, preferably 70% or more. Alternatively or additionally, the spring rate of the second spring element is in the range of 70% or less, preferably 65% or less.

In a further preferred embodiment, the secondary spring element is selected from the list of:
coil spring, preferably helical
wave spring,
a plurality of ring elements, preferably disk springs or washers, spaced apart from one another in the direction of the longitudinal axis, or
a resiliently deformable cage.

In a preferred embodiment, in particular in case of using one of the elements from the aforementioned list, the secondary spring element is stiffer in a radial direction than the primary spring element. In this the radial direction is understood to be perpendicular to the direction of the longitudinal axis. This allows a more homogeneous deformation of the primary spring element in the axial direction, since the radial expansion is restricted by the secondary spring element. This in turn allows the jounce bumper to be designed narrower, i.e. having a reduced width relative to its length. As a consequence thereof, also the surrounding parts of e.g. the vehicle or vehicle suspension system can be dimensioned more efficiently.

Alternatively or additionally, the secondary spring element preferably is softer (as opposed to stiffer) in the longitudinal direction than the primary spring element. This allows for desired deformation behavior (soft initially and progressively stiff subsequently) while at the same time contributing to an increased block length.

In a further preferred embodiment, the first material is a cellular polyisocyanate polyaddition product.

The base body here can be composed of an elastomer, but it can also be composed of a plurality of elastomers which are present in layers, in shell form or in another form or also in a mixture with one another. The polyisocyanate polyaddition products are preferably constructed on the basis of microcellular polyurethane elastomers, on the basis of thermoplastic polyurethane or from combinations of said two materials which may optionally comprise polyurea structures.

Microcellular polyurethane elastomers which, in a preferred embodiment, have a density according to DIN 53420 of 200 kg/m$^3$ to 1100 kg/m$^3$, preferably 300 kg/m$^3$ to 800 kg/m$^3$, a tensile strength according to DIN 53571 of 2 N/mm$^2$, preferably 2 N/mm$^2$ to 8 N/mm$^2$, an elongation according to DIN 53571 of 300%, preferably 300% to 700%, and a tear strength according to DIN 53515 of preferably 8 N/mm to 25 N/mm are particularly preferred.

The elastomers are preferably microcellular elastomers on the basis of polyisocyanate polyaddition products, preferably having cells with a diameter of 0.01 mm to 0.5 mm, particularly preferably 0.01 to 0.15 mm.

Elastomers on the basis of polyisocyanate polyaddition products and the production thereof are known in general and described numerously, for example in EP A 62 835, EP A 36 994, EP A 250 969, DE A 195 48 770 and DE A 195 48 771.

Production customarily takes place by reacting isocyanates with compounds which are reactive to isocyanates.

The elastomers on the basis of cellular polyisocyanate polyaddition products are customarily produced in a mold in which the reactive starting components are reacted with one another. Suitable molds here are generally customary molds, for example metal molds, which, on the basis of their shape, ensure the three dimensional shape according to the invention of the spring element. In one embodiment, the contour elements are integrated directly in the casting mold; in a further embodiment, they are retrospectively incorporated into the concentric basic body. In a preferred embodiment, the concentric spring element is cooled for this purpose until it solidifies, preferably with liquid nitrogen, and processed in this state.

The polyisocyanate polyaddition products can be produced according to generally known methods, for example by the following starting substances being used in a single or two stage process:
(a) isocyanate,
(b) compounds reactive to isocyanates,
(c) water and optionally
(d) catalysts,
(e) blowing agents and/or
(f) auxiliary and/or additional substances, for example polysiloxanes and/or fatty acid sulfonates.

The surface temperature of the inner wall of the mold is customarily 40° C. to 95° C., preferably 50° C. to 90° C. The production of the molded parts is advantageously carried out at an NCO/OH ratio of 0.85 to 1.20, wherein the heated starting components are mixed and brought in a quantity corresponding to the desired molded part density into a heated, preferably tightly closing molding tool. The molded parts are cured for 5 minutes to 60 minutes and then can be removed from the mold. The quantity of the reaction mixture introduced into the molding tool is customarily dimensioned in such a manner that the molded bodies obtained have the density already presented. The starting components are customarily introduced into the molding tool at a temperature of 15° C. to 120° C., preferably of 30° C. to 110° C. The degrees of compression for producing the molded bodies lie between 1.1 and 8, preferably between 2 and 6. The cellular polyisocyanate polyaddition products are expediently produced according to the "one shot" method with the aid of high pressure technology, low pressure technology or in particular reaction injection molding technology (RIM) in open or preferably closed molding tools. The reaction is carried out in particular by compression in a closed molding tool. The reaction injection molding technology is described, for example, by H. Piechota and H. Rohr in "Integralschaumstoffe", Carl Hanser-Verlag, Munich, Vienna 1975; D. J. Prepelka and J. L. Wharton in Journal of Cellular Plastics, March/April 1975, pages 87 to 98 and U. Knipp in Journal of Cellular Plastics, March/April 1973, pages 76-84.

In a further preferred embodiment the second material comprises or consists of: An elastomer, a metal, preferably steel, a steel alloy, aluminium or an aluminium alloy, a fibre-composite material or a combination of several or all of the aforementioned materials. If metal is used, preferably a primer is disposed between the first and second spring element such as to improve mechanical bonding between the two spring elements and to increase the jounce bumpers longevity.

The second material preferably has one, several or all of the following properties
- a Young's modulus of 225 MPa or more, further preferably 750 MPa or more, or preferably a Young's modulus of 2200 MPa or lower, or particularly preferred a Young's modulus in a range from 800 MPa to 2200 MPa;
- a hardness of 40 D or more, preferably 60 D or more, or preferably a shore hardness of 90 D or lower, or particularly preferred in range from 60 D to 90 D;
- a tensile strength of 40 MPa or more, or preferably a tensile strength of 70 MPa or lower or particularly preferred a tensile strength in a range of 40 MPa to 70 MPa;
- a density of 1.10 g/cm$^3$ or higher, or preferably a density of 1.45 g/cm$^3$ or lower, or particularly preferred in a range from 1.10 to 1.45 g/cm$^3$.

The secondary spring element preferably has an initial stiffness in the longitudinal direction in a range of 60 N/mm or less, preferably 20 N/mm or less, further preferably 10 N/mm or less.

Preferably, the secondary spring element has an initial stiffness in the longitudinal direction in a range of 3 N/mm or more, preferably 5 N/mm or more.

The Young's modulus preferably is determined according to DIN EN ISO 527. The hardness preferably is determined in accordance with DIN ISO 7619-1(3S). The tensile strength preferably is determined according to DIN 53504-S2.

In particularly preferred embodiments, the second material comprises or consists of an elastomer, and said elastomer is selected from the list of
- polyether-based polyurethane,
- polyester-based polyurethane,
- polyether-based thermoplastic polyurethane,
- polyester-based thermoplastic polyurethane,
- semi-crystalline thermoplastic
  - fiber composite material having thermoplastic polyurethane as matrix material, said thermoplastic material preferably being polyester-based.

Beneficially, these materials can bond chemically to volume-compressible materials such as the aforementioned cellular polyisocyanate polyaddition product.

A preferred polyether-based or polyester-based polyurethanes would for example be Elasturan® commercially available from BASF Polyurethanes GmbH, Lemfoerde, Germany.

A preferred polyether-based TPU would for example be Elastollan®, line 12, such as 1283 D 11 U 000 or 1278 11 U 000, commercially available from BASF Polyurethanes GmbH, Lemfoerde, Germany. A preferred polyester-based fiber composite material would for example be Elastollan® line R such as R2000 commercially available from BASF Polyurethanes GmbH, Lemfoerde, Germany.

A preferred polyester-based TPU would for example be Ellastolan® C74 D50 commercially available from BASF Polyurethanes GmbH, Lemfoerde, Germany.

A preferred semi-crystalline thermoplastic would for example be polyoxymethylene (POM) or polyamide such as PA 6.6.

In a further preferred embodiment, the secondary spring element is a wave spring as mentioned hereinabove and comprises a first end portion, and opposite second end portion and a number of adjacently placed undulating rings in between the two end portions, each ring undulating in the direction of the longitudinal axis. The undulating rings in other words extend circumferentially around the secondary spring element and have a meandering shape between portions which are closer to the first end portions and portions which are closer to the second end portion. In those portions which are closest to one respective end portion, each undulating ring is preferably coupled either with one of the end portions, or with an adjacent undulating ring.

Further preferred, the wave spring is integrally formed such that the end portions and the rings seamlessly merge into one another.

In a preferred embodiment, the secondary spring element comprises a plurality of merging sections wherein in each merging section, one of the rings merges either into one of the end portions or one of the adjacent rings. It is to be understood that among a plurality of undulating rings, those rings which are closest to the respective end portions merge into their neighboring end portion, while the intermediate rings merge into one another.

In a further preferred embodiment, the merging sections for adjacent rings are shaped uniformly across the secondary spring element. Further preferably, the merging sections where a ring merges into an end portion are also formed uniformly across the secondary spring element.

In a further preferred embodiment, for all merging sections or at least the merging sections between adjacent rings, to respectively adjacent merging sections are spaced from one another at an angle about the longitudinal axis, said angle preferably being in a range between 15° and 165°, further preferred between 60° and 120° and particularly preferred between 75° and 105°.

Preferably, adjacent merging sections are spaced apart from another at an angle of 90° about the longitudinal axis.

The aforementioned equidistant distribution of adjacent merging sections achieves an improved uniformity of the elastic deformation in particular to lateral bending of the secondary spring element in particular and the jounce bumper in general. This positively impacts the deformation characteristics of the jounce bumper as a whole.

In a further preferred embodiment, each merging section comprises a pinched portion extending in the longitudinal direction. The pinching portions in the merging sections contribute to a more flexible deformation of the secondary spring element.

In a further preferred embodiment, at least one of the end portions of the secondary spring element comprises a plurality of inwardly extending protrusions. Preferably, the protrusions are spaced apart from one another and create recesses in between adjacent protrusions. Preferably, the protrusions are distributed evenly along the circumference of the secondary spring element.

In a further preferred embodiment, at least one of the end portions of the secondary spring element comprises a plurality of outwardly extending protrusions. In preferred embodiments, also the outwardly extending protrusions are formed in similar fashion to the inwardly extending protrusions, namely distributed (preferably equidistantly) along the circumference of the end portion such as to define recesses in between adjacent protrusions.

The protrusions allow for better embedding of a secondary spring element inside the primary spring element when filled with material of the base body.

In a further preferred embodiment, at least one of the end portions of the secondary spring element comprises a plurality of material passages extending in the direction of the longitudinal axis. The material passages may be filed with spring material of the primary spring element, i.e. based body, or may be left void. If void, the material passages are functioning as air escape holes which facilitate compression of the jounce bumper.

The invention has hereinabove been described under a first aspect with respect to the jounce bumper itself. In a second aspect, the invention also relates to a method of reducing a jounce bumper for use in an automotive vehicle suspension system, and in particular a jounce bumper according to any one of the preferred embodiments described herein above.

The invention achieves the object mentioned initially by having the method comprised the steps of:
  providing a mold having an inner shape that corresponds to a predetermined outer shape of a base body of the jounce bumper to be produced,
  locating a spring element within the mold, wherein the spring element is resiliently deformable between a first length in the uncompressed state and a second length in the compressed state and partially of completely made of a compact material, and
  casting a reaction mixture around the spring element in the mold, said reaction mixture being configured to form a volume-compressible material, and
  providing reaction conditions inside the mold such that the reaction mixture expands, and forms a volume-compressible material that assumes the outer shape of the base body and integrates the spring element within itself.

The process of providing reaction mixture and respective reaction conditions for producing the volume-compressible material is generally known in the art, as mentioned hereinabove.

Accordingly, the reaction mixture and the reaction conditions required for the respective reaction mixture can and will be chosen from among the commercially available methods and publicly available literature. The key realization of the invention according to the second aspect is that the base body would typically be produced in a one-stage or multiple-stage procedure involving at least one stage of casting a liquid reaction mixture into a mould. The additional effort of introducing a secondary spring element into that mould prior to the expansion of the reaction mixture to form the volume-compressible material is minor. There is almost no economical drawback in adding the spring element into the mould (aside from the cost of producing or providing the secondary spring element). The procedure of creating the base body can otherwise virtually remain the same. No additional production or installation measures need to be undertaken after producing the base body, since the secondary spring element is then already integrated into the base body and will remain there as long as the base body is structurally intact, which is the entire lifespan of the jounce bumper.

In a third aspect, the invention achieves the initially mentioned object under a third aspect by suggesting of use of a spring element that is partially or completely made of a compact material as a secondary spring element within a base body of a jounce bumper wherein the secondary spring element is integrated within the base body, and the base body is formed from a volume-compressible material in particular a described in any one of the preferred embodiments described herein above for the first aspect and second aspect.

The preferred embodiments of the jounce bumper under the first aspect are at the same time preferred embodiments of the method of the second aspect and the use of the third aspect and vice versa. Likewise, the advantages and benefits described herein above with respect to the jounce bumper are in the same time advantages and benefits of the inventive method and the inventive use and vice versa such that references made to the statements herein above in order to prevent unnecessary repetition.

In a fourth aspect, the invention relates to a spring element for use in a suspension system, in particular in an automotive vehicle suspension system, wherein the spring element is resiliently deformable between a first length in the uncompressed state and a second length in the compressed state the second length being smaller than the first length, and partially or completely made of a compact material.

The spring element which has been hereinabove described as an integral part of the jounce bumper according to the invention is preferentially suitable to be integrated according to the first, second and third aspects within a base body that acts as a primary spring element at a first spring rate, and the spring element is a secondary spring element comprising a second spring rate that is lower than the first spring rate, wherein the spring rate is defined as the ratio by which the respective spring element can be compressed relative to its uncompressed basic state.

The spring element of this fourth aspect however also represents an inventive aspect on its own, wherein the spring element is configured according to the secondary spring element of the jounce bumper defined in any one of the preferred embodiments described hereinabove. Preferred embodiments of the so-called secondary spring element of the first to third aspects are at the same time preferred embodiments of the fourth aspect and vice versa. Reference is made to the description hereinabove and to the following description.

In a preferred embodiment, the spring element is configured to have a predetermined block length when in the compressed state.

The spring rate of the spring element is in the range of 70% or less, preferably 65% or less.

In a further preferred embodiment, the spring element is a wave spring.

In a further preferred embodiment the spring element comprises or consists of: an elastomer, a fibre-composite material or a combination of several or all of the aforementioned materials.

The material of the spring element preferably has one, several or all of the following properties:
  a Young's modulus of 225 MPa or more, further preferably 750 MPa or more, or preferably a Young's modulus of 2200 MPa or lower, or particularly preferred a Young's modulus in a range from 800 MPa to 2200 MPa;
  a hardness of 40 D or more, preferably 60 D or more, or preferably a shore hardness of 90 D or lower, or particularly preferred in range from 60 D to 90 D;

a tensile strength of 40 MPa or more, or preferably a tensile strength of 70 MPa or lower or particularly preferred a tensile strength in a range of 40 MPa to 70 MPa;

a density of 1.10 g/cm$^3$ or higher, or preferably a density of 1.45 g/cm$^3$ or lower, or particularly preferred in a range from 1.10 to 1.45 g/cm$^3$.

The spring element preferably has an initial stiffness in the longitudinal direction in a range of 60 N/mm or less, preferably 20 N/mm or less, further preferably 10 N/mm or less, or the secondary spring element has an initial stiffness in the longitudinal direction in a range of 3 N/mm or, preferably 5 N/mm or more, or the secondary spring element has an initial stiffness in the longitudinal direction in a range from 3 N/mm to 60 N/mm, preferably 5 N/mm to 20 N/mm, further preferred in a range from 6 N/mm to 15 N/mm.

The Young's modulus preferably is determined according to DIN EN ISO 527. The hardness preferably is determined in accordance with DIN ISO 7619-1(3S). The tensile strength preferably is determined according to DIN 53504-S2.

In particularly preferred embodiments, the spring element comprises or consists of an elastomer, and said elastomer is selected from the list of
- polyether-based polyurethane,
- polyester-based polyurethane,
- polyether-based thermoplastic polyurethane,
- polyester-based thermoplastic polyurethane,
- semi-crystalline thermoplastic
- fiber composite material having thermoplastic polyurethane as matrix material, said thermoplastic material preferably being polyester-based.

Beneficially, these materials can bond chemically to volume-compressible materials such as the aforementioned cellular polyisocyanate polyaddition product.

A preferred polyether-based or polyester-based polyurethanes would for example be Elasturan® commercially available from BASF Polyurethanes GmbH, Lemfoerde, Germany.

A preferred polyether-based TPU would for example be Elastollan®, line 12, such as 1282 D 11 U 000 or 1278 11 U 000, commercially available from BASF Polyurethanes GmbH, Lemfoerde, Germany. A preferred polyester-based fiber composite material would for example be Elastollan® line R such as R2000 commercially available from BASF Polyurethanes GmbH, Lemfoerde, Germany.

A preferred polyester-based TPU would for example be Ellastolan® C74 D50 commercially available from BASF Polyurethanes GmbH, Lemfoerde, Germany.

A preferred semi-crystalline thermoplastic would for example be polyoxymethylene (POM) or polyamide such as PA 6.6.

In a further preferred embodiment, the spring element is a wave spring as mentioned hereinabove and comprises a first end portion, and opposite second end portion and a number of adjacently placed undulating rings in between the two end portions, each ring undulating in the direction of the longitudinal axis. The undulating rings in other words extend circumferentially around the spring element and have a meandering shape between portions which are closer to the first end portions and portions which are closer to the second end portion. In those portions which are closest to one respective end portion, each undulating ring is preferably coupled either with one of the end portions, or with an adjacent undulating ring.

Further preferred, the wave spring is integrally formed such that the end portions and the rings seamlessly merge into one another.

In a preferred embodiment, the spring element comprises a plurality of merging sections wherein in each merging section, one of the rings merges either into one of the end portions or one of the adjacent rings. It is to be understood that among a plurality of undulating rings, those rings which are closest to the respective end portions merge into their neighboring end portion, while the intermediate rings merge into one another.

In a further preferred embodiment, the merging sections for adjacent rings are shaped uniformly across the secondary spring element. Further preferably, the merging sections where a ring merges into an end portion are also formed uniformly across the secondary spring element.

In a further preferred embodiment, for all merging sections or at least the merging sections between adjacent rings, to respectively adjacent merging sections are spaced from one another at an angle about the longitudinal axis, said angle preferably being in a range between 15° and 165°, further preferred between 60° and 120° and particularly preferred between 75° and 105°.

Preferably, adjacent merging sections are spaced apart from another at an angle of 90° about the longitudinal axis.

The aforementioned equidistant distribution of adjacent merging sections achieves an improved uniformity of the elastic deformation in particular to lateral bending of the spring element.

In a further preferred embodiment, each merging section comprises a pinched portion extending in the longitudinal direction. The pinching portions in the merging sections contribute to a more flexible deformation of the spring element.

In a further preferred embodiment, at least one of the end portions of the spring element comprises a plurality of inwardly extending protrusions. Preferably, the protrusions are spaced apart from one another and create recesses in between adjacent protrusions. Preferably, the protrusions are distributed evenly along the circumference of the secondary spring element.

In a further preferred embodiment, at least one of the end portions of the spring element comprises a plurality of outwardly extending protrusions. In preferred embodiments, also the outwardly extending protrusions are formed in similar fashion to the inwardly extending protrusions, namely distributed (preferably equidistantly) along the circumference of the end portion such as to define recesses in between adjacent protrusions.

The protrusions allow for better embedding of a secondary spring element inside the primary spring element when filled with material of the base body.

In a further preferred embodiment, at least one of the end portions of the spring element comprises a plurality of material passages extending in the direction of the longitudinal axis. The material passages may be filed with spring material when embedded in a primary spring element, i.e. based body, or may be left void. If void, the material passages are functioning as air escape holes which facilitate compression of the spring element.

Figure 2C:
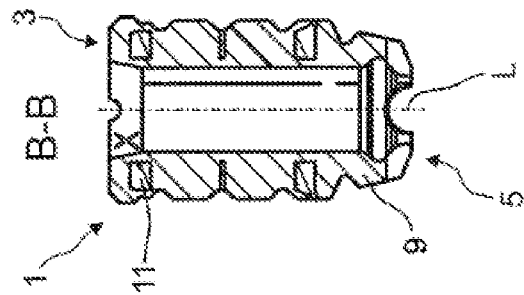
FIG. 2C shows a third cross-sectional view of the jounce bumper of FIG. 1.
Figure 2B:
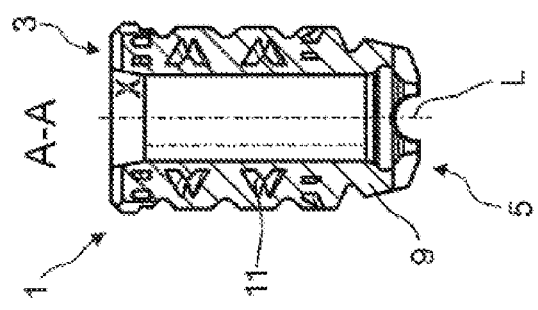
FIG. 2B shows a second cross-sectional view of the jounce bumper of FIG. 1.
Figure 2D:
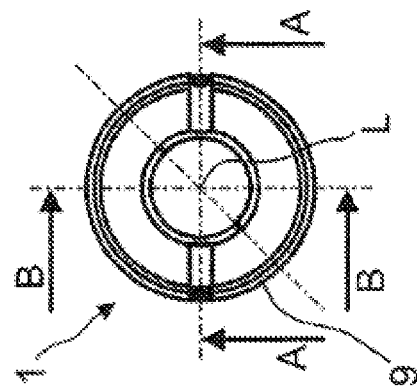
FIG. 2D shows a side view of the jounce bumper of FIG. 1.
Figure 2A:
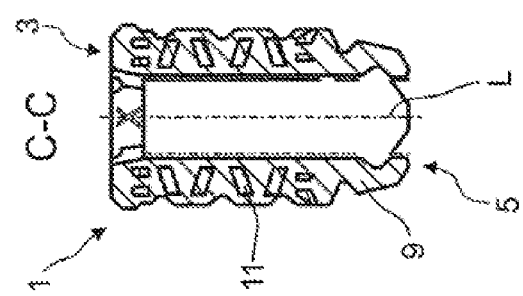
FIG. 2A shows a first cross-sectional view of the jounce bumper of FIG. 1.
Figure 3:
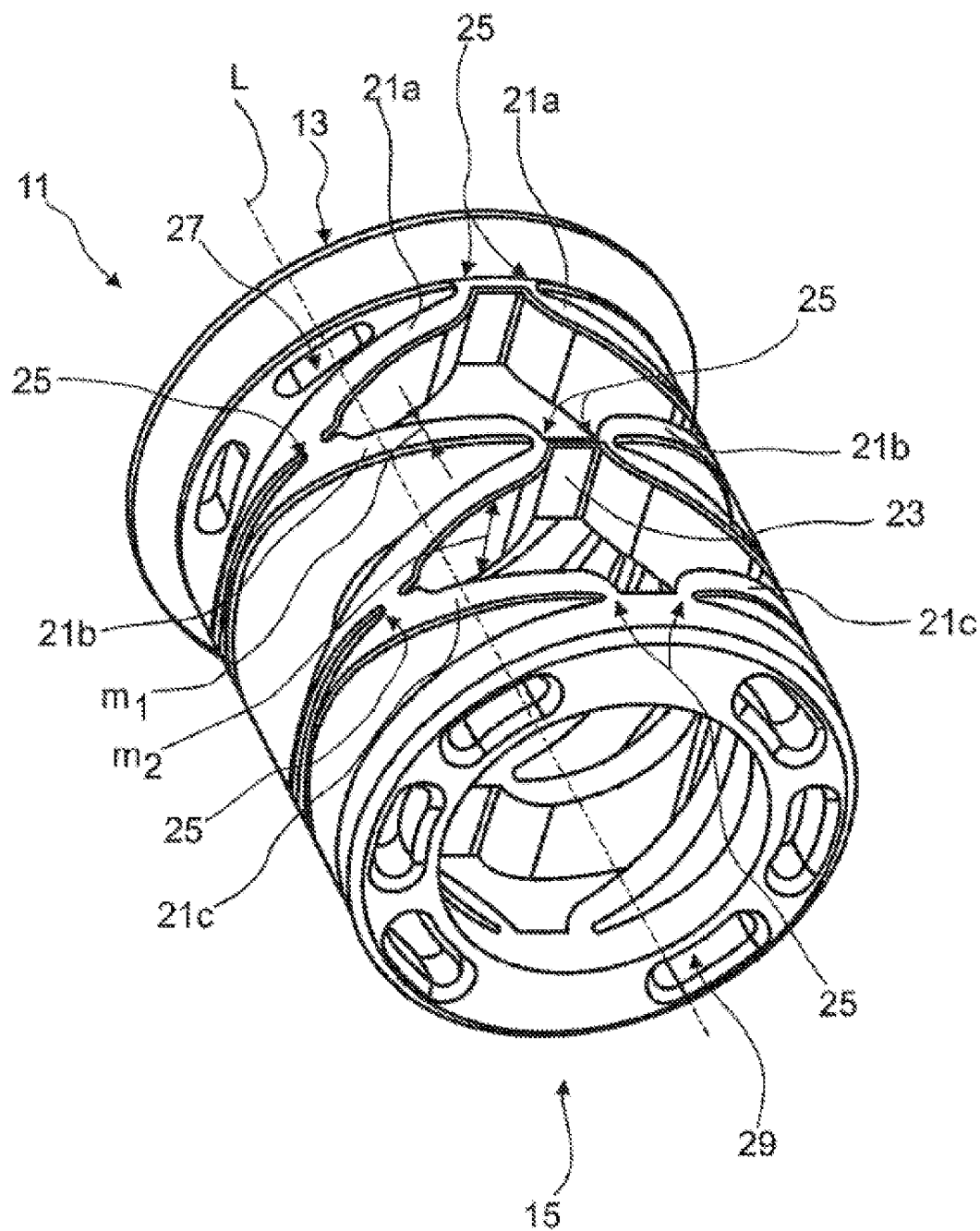
FIG. 3 shows a schematic three-dimensional view of a secondary spring part for the jounce bumper of FIGS. 1 to 2D.

Hereinafter, the invention will be described in more detail with reference to the accompanying drawings of a preferred embodiment. Herein:

FIG. 1 shows a schematic three-dimensional view of a jounce bumper according to a preferred embodiment, FIGS. 2A-2D show different side views and cross-sectional views of the jounce bumper of FIG. 1, FIG. 3 shows a schematic three-dimensional view of a secondary spring part for the jounce bumper of FIGS. 1 and 2A-2D.

Figure 4A:
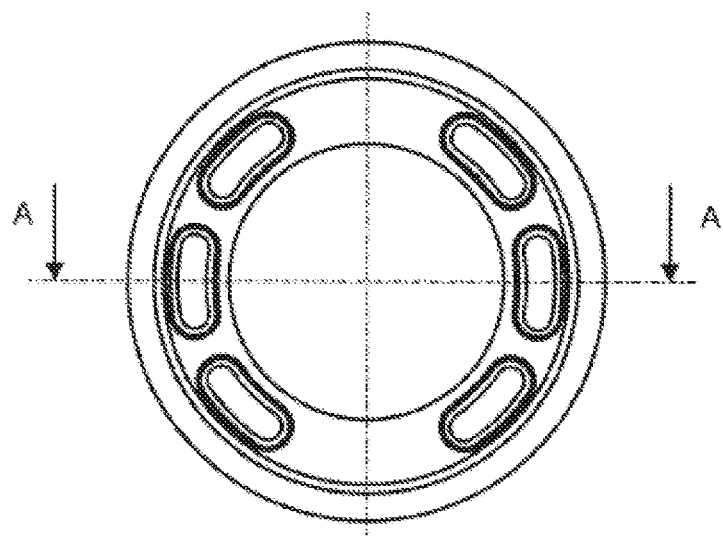
FIG. 4A shows a side view of the spring element of FIG. 3.
Figure 4B:
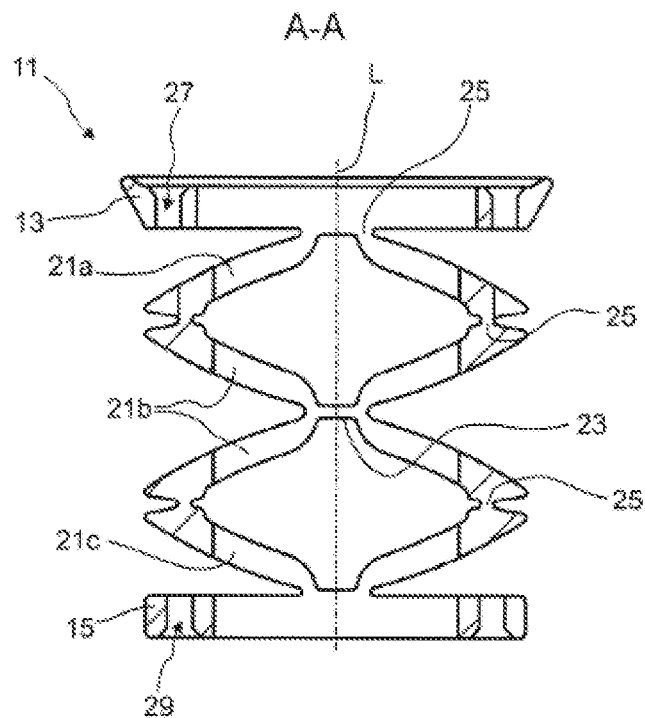
FIG. 4B shows a cross-sectional view of the spring element of FIG. 3.
Figure 5:
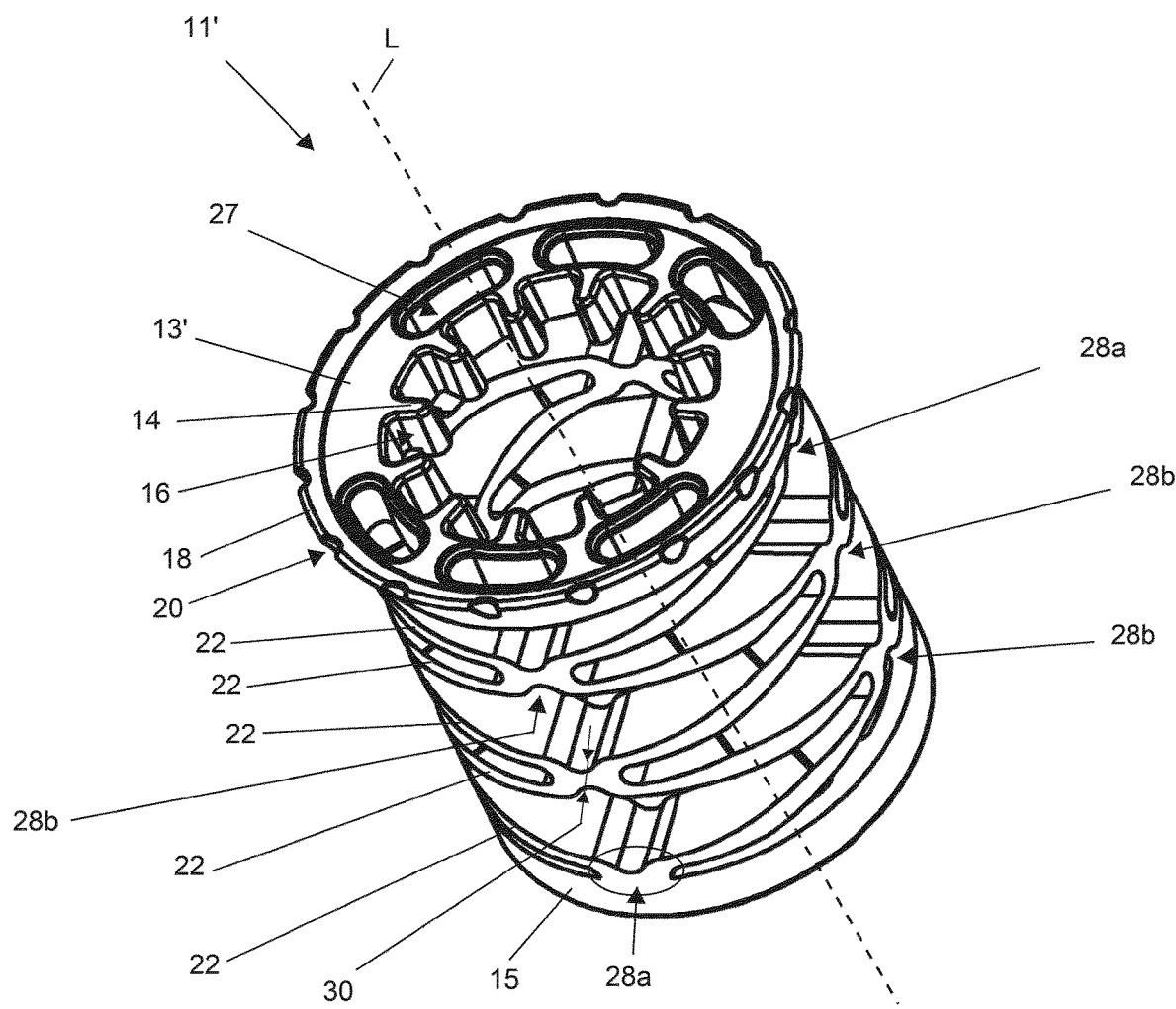
FIG. 5 shows a schematic three-dimensional view of an alternative secondary spring part for the jounce bumper of FIGS. 1 to 2D.

FIGS. 4A-4B show different side and cross-sectional views of the spring element of FIG. 3, FIG. 5 shows a schematic three-dimensional view of an alternative secondary spring part for the jounce bumper of FIGS. 1 and 2A-2D, and FIG. 6 shows different side and cross-sectional views of the spring element of FIG. 5.

FIG. 1 shows a typical outside view of a jounce bumper 1 in accordance with a preferred embodiment of the invention. The jounce bumper 1 comprises a first end face 3 and an opposite end face 5 spaced apart from the first end phase 3 along a longitudinal axis L. The jounce bumper 1 has a substantially cylindrical shape and comprises a number of lateral annular recesses 7 which are configured to facilitate the axial compression, i.e. a compression in the direction of the longitudinal axis. In FIG. 1, the jounce bumper 1 is shown in its uncompressed basic state. The cylindrical shape is common in automotive applications. However, it is to be understood, that other shapes are possible within the scope of the invention, such as for example polygonal shapes or (partially completely) oval shapes.

When in operation, the jounce bumper will resiliently deform upon external impacts to the vehicle suspension system such that the two end faces 3, 5 approach each other. The resistance which the jounce bumper 1 builds up against this deformation characterizes the overall deformation behaviour of the jounce bumper 1.

The jounce bumper 1 comprises a base body 9 which is made of a volume-compressible material, for example, micro-cellular polyurethane foam such as commercially available as Cellasto® from BASF Polyurethanes GmbH, Lemfoerde, Germany.

The volume-compressible material of the base body has a favourable deformation behaviour in that it and easily and elastically deforms. At the same time, the volume-compressible material has a very short block length in the direction of the longitudinal axis when considered purely on its own.

The interior setup of the jounce bumper of FIG. 1 is shown in more detail in FIGS. 2A-2D.

As can be seen in particular from FIGS. 2A-2C, which are cross-sectional views as indicated in FIG. 2D, the basic body 9 is not the only constituent of the jounce bumper 1. Rather, the base body 9 acts as a primary spring element, and the jounce bumper further comprises a secondary spring element 11 which is integrated into the base body 9, preferably by virtue of the base body 9 being moulded around the secondary spring element 11. The secondary spring element 11 preferably is made of a compact, non-volume-compressible material different from the first material of the base body 9. The secondary spring element is resiliently deformable between the uncompressed basic state, shown in FIGS. 2A-2C, and a compressed state, wherein in the compressed state, the secondary spring element is shorter in the direction of the longitudinal axis L than in the uncompressed basic state. The block length of the secondary spring element per se is, due to the compact nature of its material, significantly larger than it would be if it were made from a volume-compressible material.

Thus, the secondary spring element 11 provides a predetermined minimum block length to the jounce bumper 1.

At the same time, the secondary spring element 11 is resiliently deformable such that it deforms jointly with the base body 9.

By being integrated completely into the material of the base body 9, the secondary spring element is completely shielded from environmental influences, in particular particles, fluids and radiation.

In particular, the cross-sectional views of FIGS. 2A-2C show that the secondary spring element 11 is completely encapsulated inside the base body 9. The material strength is, according to those cross-sectional views of FIGS. 2A-2C, not identical over the entire circumference of the secondary spring element 11. The complete structural layout of the secondary spring element according to the preferred embodiment is shown in more detail in FIG. 3.

As can be seen from FIG. 3 in particular, the secondary spring element 11 is formed as a resiliently deformable cage. The secondary spring element 11 comprises a first end portion 13 and an opposite second end portion 15. When moulded into the jounce bumper, the first end portion 13 is positioned facing towards the first end phase 3 of the jounce bumper 1, while the second end portion 15 faced towards the second end phase 5 of the jounce bumper 1.

Between the two end portions 13, 15, the secondary spring element 11 comprises a plurality of angled spring leaves 21a, b, c, each of which is oriented at an angle with respect to the first and second end portions 13, 15.

FIG. 3 shows the secondary spring element 11 in its uncompressed basic state.

When placed under axial load, the spring leaves 21a, b, c pivot with respect to the end portions 13, 15, such that the angle between the spring leaves 21a, b, c and the respective end portions 13, 15 or the respective adjacent spring leave decreases. If no material were present in between the end portions 13, 15 and the spring leaves 21a, b, c, the spring leaves 21a, b, c would pivot until they abut against the respective adjacent spring leave or end portion, defining the minimum block length of the secondary spring element. When moulded inside the base body 9 of the jounce bumper 1, as shown in FIGS. 1 and 2A-2D, the secondary spring element 11 will in most cases not reach its theoretically possible minimum block length due to the material of the base body 9 in between the spring leaves 21a, b, c and end portions 13, 15, respectively.

As can be seen from FIG. 3, the spring leaves 21a, b, c are configured to have a first material thickness M1 in the direction of the longitudinal axis L, and a second material thickness M2 in a radial direction with respect to the longitudinal axis L. The second material thickness M2 is larger than the first material thickness M1. Combined, this has the effect of the secondary spring element 11 being very easily deformable in the axial direction L leading to a low spring rate, while at the same time allowing for very little transversal expansion during compression, which in turn is beneficial for the compression stability in the radial direction of the jounce bumper 1 on the whole.

Preferably, a set of first spring leaves 21a is integrally formed to the first end portion 13, while a second set of spring leaves 21c is integrally formed with the second end portion 15.

The secondary spring element 11 further comprises a number of intermediate spring leaves 21b which are respectively integrally formed with adjacent spring leaves 21a, b, c.

To allow for better axial compression i.e. in the direction of the longitudinal axis L, the secondary spring element 11 preferably comprises joints 25 of reduced material thickness to facilitate the pivoting movement of the spring leaves 21a, b, c.

In order to provide improved passage of moulding material of the base body 9 through the volume of the secondary spring element 11, the first end portion 13 preferably comprises a plurality of material passages 27 into which and through which the volume-compressible material of the base body 9 can expand during moulding.

Likewise, preferably the second end portion 15 comprises a plurality of material passages 29 for allowing the volume-compressible first material of the base body 9 to pass through the second end portion 19.

FIGS. 4A & 4B show a side view (FIG. 4A) and a cross-sectional view (FIG. 4B) of the secondary spring element 11. As can be seen in FIG. 3 and FIG. 4B, in particular, some of the intermediate spring leaves 21b are integrally joined by a ridge 23 to again improve transversal stability.

The secondary spring element shown in FIGS. 1-4B provides merging sections that are shaped according to two types of joints between the end portions 13, 15 and the spring leaves 21a, b, c. In particular, the joints 25 between adjacent spring leaves 21a, b have a quite articulated pinching to provide for easy bending, while at the same time extending across a substantial angular range about the longitudinal axis L, as best seen in FIG. 3. The joints 25 are arranged oppositely of one another, their center points being in one common plane which also comprises the longitudinal axis L.

The center points of the ridges 23 are located in a second plane perpendicular to that aforementioned plane. The ridges 23 are also rather thin and provide stability to the secondary spring element 11 in so far as that the spring leaves 21b, c are prevented from escaping radially outwards or inwards during compression.

Figure 6:
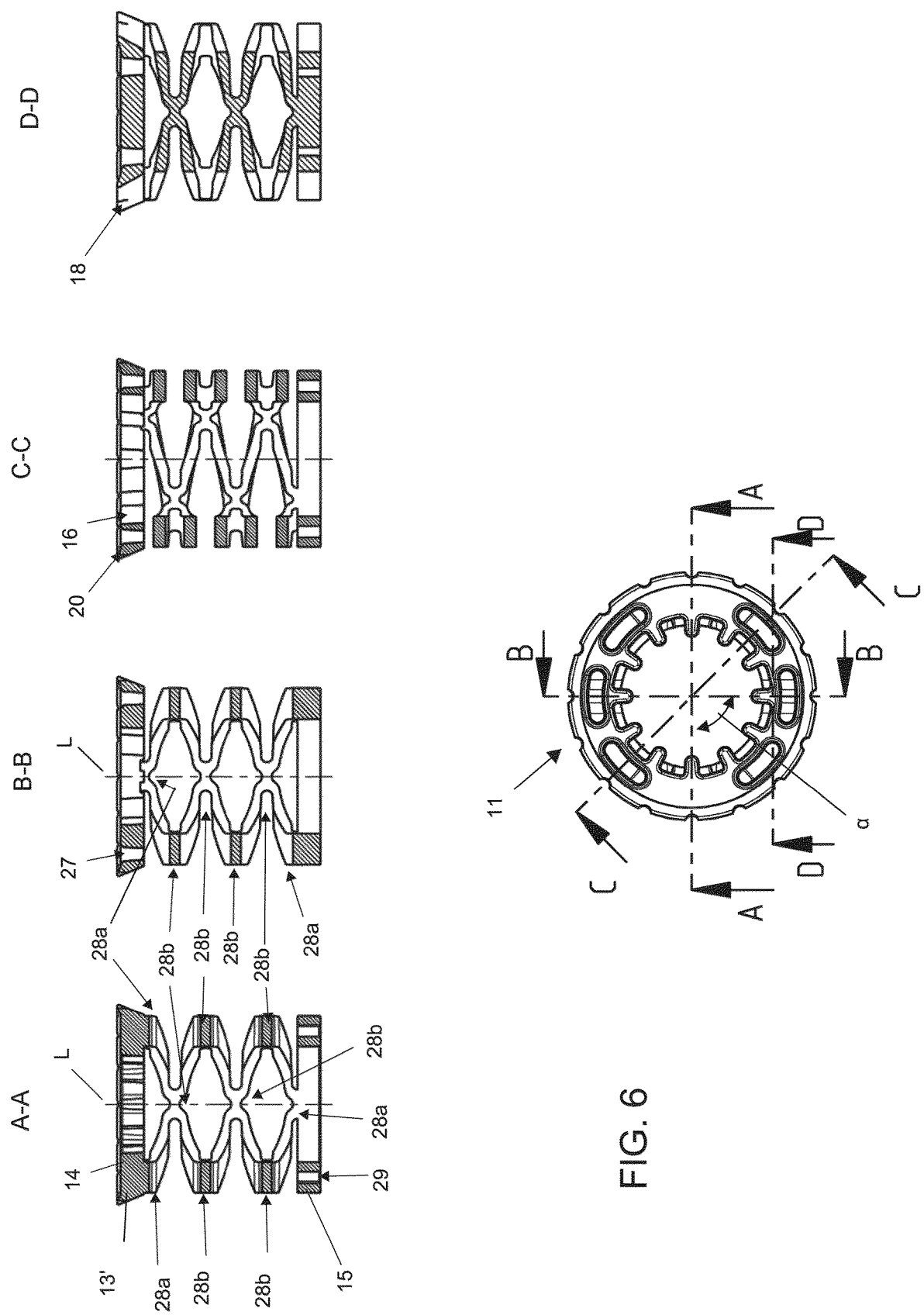
FIG. 6 shows different side and cross-sectional views of the spring element of FIG. 5.

FIGS. 5 and 6 show an alternative embodiment of a secondary spring element 11' which shares many structural features and qualities with the spring element 11 shown exemplarily in FIGS. 1-4B. Identical features have been designated with identical references signs, and reference is made to the description hereinabove to avoid unnecessary repetition.

The secondary spring element 11' differs from the secondary spring element 11 of FIGS. 1-4B in that the first end portion 13' comprises a plurality of inwardly extending protrusions 14, which in the present embodiment are formed as radial ribs extending towards the longitudinal axis L. These protrusions 14 act as additional structural reinforcements. In between adjacent protrusions 14, recesses 16 are formed which may be fill with material to further anchor the secondary spring element 11' inside the primary spring element i.e. base body.

Furthermore, the secondary spring element 11' comprises, also in the first end portion 13', a plurality of outwardly extending protrusions 18. The protrusions 18 are spaced apart from one another by recesses 20 which may act as air escape cavities or may also be filled with material from the primary spring element. Likewise, also the inward recesses 16 between adjacent protrusions 14 may act as air escape cavities if left void. The material passages 25, 27 of the secondary spring elements 11, 11' may also be filled with material of the base body or left void as above.

The secondary spring element 11' differs from the secondary spring element 11 in the structure of the elastic elements themselves: While the secondary spring element 11 comprises oppositely positioned spring leaves 21a, b, c, the secondary spring element 11' comprises a refined version thereof in the shape of a plurality of undulating rings which extend circumferentially around the longitudinal axis L and are shaped more uniformly along the circumference as compared to the setup of the secondary spring element 11.

Each ring 22 is integrally formed with the secondary spring element 11'. The rings 22 either merge with one of the end portions 13', 15 in a merging section 28a or with an adjacently positioned ring 22 in a merging section 28b. While also the ridges 23 and joints 25 of the secondary spring element 11 of the first embodiment are merging sections in principle, the mechanical behavior of those elements is not identical to each other.

In contrast thereto, all merging sections 28b have essentially the same deformation behavior, and all merging sections 28a do also have the same deformation behavior.

The setup shown in FIGS. 5, 6 provides that each merging section 28a, b is spaced apart from an adjacent merging section 28b by an angle $\alpha$ of 90 degrees about the longitudinal axis L so that uniformity of deformation is improved as compared to the embodiment of FIGS. 1-4B.

The second merging sections 28b, and to an extent also the first merging sections 28a, comprise a pinching section 30 extending in the direction of the longitudinal axis L to provide for improved flexibility, thereby reducing the risk of mechanical failure of the secondary spring element 11'.

In the description of the figures hereinabove, the secondary spring elements 11, 11' are described in conjunction with the jounce bumper of one aspect of the invention. It is to be understood, however, that the spring elements represent an inventive aspect on their own such that features mentioned hereinabove in combination with features of the jounce bumper are to be contemplated also independently thereof as far as their structure and functionality are concerned.

The invention claimed is:

1. A jounce bumper of an automotive vehicle suspension system, comprising:
   a longitudinal axis, wherein the jounce bumper is configured to resiliently deform between an uncompressed state and a compressed state, wherein in the compressed state, the jounce bumper has a smaller length in the direction of the longitudinal axis than in the uncompressed state, and
   a base body that acts as a primary spring element, wherein the base body is partially or completely made of a volume-compressible first material,
   wherein the base body comprises at least one secondary spring element integrated within the base body, wherein the at least one secondary spring element is resiliently deformable between a first length in an uncompressed state and a second length in a compressed state, wherein the second length is smaller than the first length, and wherein the at least one secondary spring element is partially or completely made of a compact second material, and
   wherein the primary spring element comprises a first spring rate, and the at least one secondary spring element comprises a second spring rate that is lower than the first spring rate, wherein a spring rate is defined as the ratio by which a respective spring element can be compressed relative to its uncompressed basic state, and
   wherein the at least one secondary spring element is a wave spring and comprises a first end portion, an opposite second end portion, and a number of adjacently placed spring leaves or undulating rings undulating in the direction of the longitudinal axis.

2. The jounce bumper of claim 1, wherein the base body at least partially encapsulates the at least one secondary spring element.

3. The jounce bumper of claim 1, wherein the at least one secondary spring element is configured to have a predetermined block length when in the compressed state.

4. The jounce bumper of claim 1, wherein the first spring rate of the primary spring element is in the range of more than 65%, and/or
wherein the second spring rate of the at least one secondary spring element is in the range of 70% or less.

5. The jounce bumper of claim 1, wherein the at least one secondary spring element is at least one selected from the group consisting of:
a coil spring,
a wave spring,
a plurality of ring elements, spaced apart from one another in the direction of the longitudinal axis, and
a resiliently deformable cage.

6. The jounce bumper of claim 1, wherein the at least one secondary spring element is stiffer in a radial direction than the primary spring element.

7. The jounce bumper of claim 1, wherein the first material is a cellular polyisocyanate polyaddition product.

8. The jounce bumper of claim 1, wherein the second material comprises:
an elastomer,
a metal,
a fiber-composite material, or
a combination of several or all of the aforementioned materials.

9. The jounce bumper of claim 8, wherein the second material has at least one of the following properties:
a Young's modulus of 225 MPa or more;
a hardness of 40D or more;
a tensile strength of 40 MPa or more; and/or
a density of 1.10 g/cm$^3$ or higher.

10. The jounce bumper of claim 1, wherein the second material comprises an elastomer, and said elastomer is selected from the group consisting of:
polyether-based polyurethane,
polyester-based polyurethane,
polyether-based thermoplastic polyurethane,
polyester-based thermoplastic polyurethane,
semi-crystalline thermoplastic, and
a fiber composite material having thermoplastic polyurethane as matrix material.

11. The jounce bumper of claim 1, wherein the spring leaves or undulating rings and the first end portion and the second end portion are integrally formed with each other, and
wherein the at least one secondary spring element comprises
a plurality of joints, or
a plurality of merging sections, wherein in each merging section, one of the undulating rings merges into one of the first end portion and the second end portion or an adjacent undulating ring.

12. The jounce bumper of claim 11, wherein for all of the plurality of merging sections, two respectively adjacent merging sections are spaced at an angle ($\alpha$) from one another.

13. The jounce bumper of claim 11, wherein each merging section of the plurality of merging sections comprises a pinched portion extending in the direction of the longitudinal axis.

14. The jounce bumper of claim 1, wherein at least one of the first end portion and the second end portion of the at least one secondary spring element comprises a plurality of inwardly extending protrusions and/or a plurality of outwardly extending protrusions.

15. The jounce bumper of claim 1, wherein at least one of the first end portion and the second end portion of the at least one secondary spring element comprises a plurality of material passages extending in the direction of the longitudinal axis.

16. A method of producing a jounce bumper for use in an automotive vehicle suspension system, the method comprising:
providing a mold having an inner shape that corresponds to a predetermined outer shape of a base body of the jounce bumper to be produced,
locating a spring element within the mold, wherein the spring element is resiliently deformable between a first length in an uncompressed state and a second length in a compressed state, and wherein the spring element is partially or completely made of a compact material,
casting a reaction mixture around the spring element in the mold, said reaction mixture being configured to expand and form a volume-compressible material under predetermined reaction conditions, and
providing the predetermined reaction conditions inside the mold such that the reaction mixture expands and forms the volume-compressible material that assumes the outer shape of the base body and integrates the spring element within,
wherein said jounce bumper is the jounce bumper according to claim 1.

17. A method, comprising:
integrating a secondary spring element within a base body of a jounce bumper, wherein the base body is formed from a volume-compressible material, and
wherein the secondary spring element is partially or completely made of a compact material,
wherein said jounce bumper is the jounce bumper according to claim 1.

* * * * *